May 26, 1959 L. E. CURRISTON 2,887,875

NO INERTIA TORQUE TESTER

Filed June 18, 1957

INV.
LOREN E. CURRISTON

BY Clyde H. Haynes
ATTY.

United States Patent Office 2,887,875

Patented May 26, 1959

2,887,875

NO INERTIA TORQUE TESTER

Loren E. Curriston, Huntington, N.Y., assignor to Lear, Incorporated

Application June 18, 1957, Serial No. 666,286

2 Claims. (Cl. 73—9)

The present invention relates to a device for determining the friction characteristics of bearings, and more particularly to the static or break away friction characteristics of very small ball bearings for gimbals or the like.

Bearing testing devices known before the present invention, utilized a weight or heavy rotor to apply the desired thrust load to the bearing being tested. These weights or rotors were attached directly to one of the bearing races and thus moved with the race. Such weighting of the race actually effectively increased the inertia of the race so that accurate readings of characteristics of the bearing could not be obtained. For example, if the bearing had a sticky spot or a spot of high friction, the mass of the weight or rotor and the race to which it was attached would carry or move the race over that spot. Because of this, the true characteristics of the bearing or the location and friction of these spots were not determined.

The present invention is directed to a device for testing bearings, and especially small ball bearings, which overcomes the above-mentioned problems and others which were encountered in the prior devices.

Thus, an object of the invention is to provide a device for testing bearings including the determining of the friction characteristics of very small ball bearings.

Another object of the present invention is to provide a device for determining the friction characteristics of very small ball bearings by rotating one race relative to the other race wherein the inertia of the rotating race is practically entirely dependent only on its own weight and is isolated from forces exerted on the bearing to establish frictions between the races.

A further object of the invention is to provide a device for testing bearings to determine such friction characteristics as sticking, break away friction, and static friction as well as the position, point, or location thereof in the bearing without those characteristics being obscured or altered or modified by inertia or other forces of the testing device or its parts.

The device for carrying out the objects of the invention in a manner as described and claimed herein generally comprises a standard, driving means bearinged in the standard to support a bearing being tested and rotate one of the races thereof, a weight, and a wire to be fitted by a suitable fitting to the other of the races to support or suspend the weight. A pointer or indicator to indicate the rotational or angular movement of the other of the bearing races is affixed to that race by suitable means, such as the fitting. If the testing device is to determine friction characteristics with the bearing loaded axially of its rotational movement such as for end thrust, the wire is positioned on the axis of rotation to suspend the weight, and the weight is prevented from turning or rotating by having a portion of it engageable with a portion of the standard, the wire serving as a light torsion spring of low spring rate. However, if the device is to determine friction characteristics with the bearing loaded radially of its axis of rotation, the wire is positioned radially of the axis and suspends the weight so that angular movement of the fitting tends to flex the wire.

For purposes of exemplification, clarity and illustration, and not of limitation, a testing device will now be more particularly described, with reference being taken to the accompanying drawings, in which.

Figure 1:
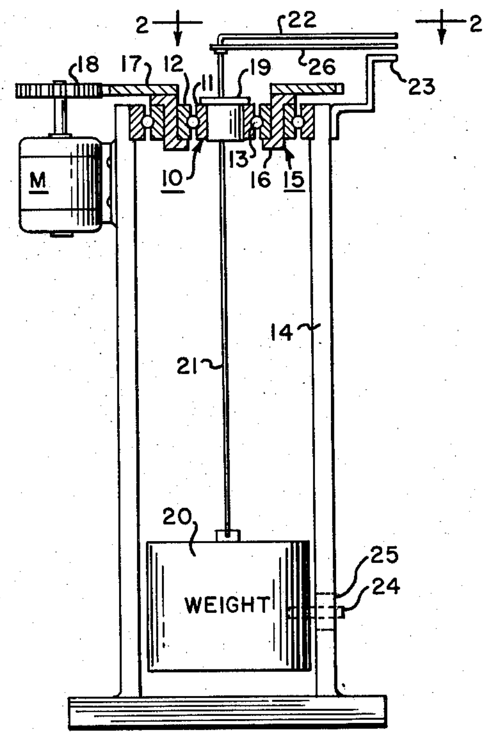
Figure 1 illustrates, partly in cross-section, a vertical elevation of the testing device.
Figure 2:
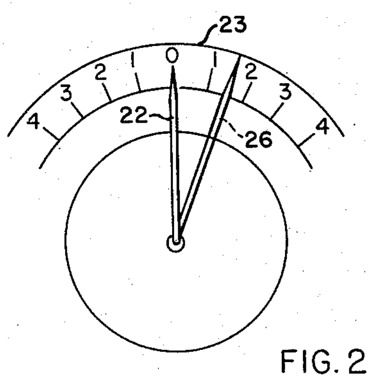
Figure 2 is a view taken along the line 2—2 of Figure 1.

The bearing torque tester illustrated in Figure 1 represents the testing or determining of friction characteristics for the thrust loading of a bearing 10 having an inner race 11 and an outer race 12 supporting balls 13.

The tester comprises a support 14, positioned in this instance, vertically, and bearingly supporting a gear or drive member 15 at the top end thereof with the rotational axis of the gear vertical. The gear 15 is preferably constructed of a somewhat cup-shaped part 16 to receive bearing 10 and hold the bearing coaxially with the gear, and a peripheral gear ring 17 which is in mesh with a driving pinion gear 18 for rotating the outer race 12 of the bearing 10.

End thrust on the bearing is accomplished by inserting a very small, very lightweight fitting 19 in the inner race 11, and suspending a weight 20 therefrom by means of a wire 21, the weight exerting tension on the wire. Although the wire 21 may be of any suitable size, shape, and material, I have found that a small torsion wire such as is commonly called piano wire, serves the purpose well, since it acts as a light torsion spring of low spring rate. As is illustrated, the wire 21 extends coaxially of the bearing 10 and the supporting gear 15 so that the only forces applied by the weight 20 at the start of the test are axial and end thrust forces.

The fitting 19 is further provided with a radially extending pointer 22 which moves over a calibrated chart or scale 23 mounted on the support 14 and extending circumferentially at least partly around the gear 15.

In using the tester, a bearing 10 to be tested is dropped or placed in gear 15, and the weight 20 suspended from the inner race thereof by means of fitting 19 and wire 21. Next, a motor, such as a 1 r.p.m. motor M, is started to slowly rotate pinion gear 18, gear 15 and thereby the outer race 12. Rotation of the weight is prevented in any suitable manner, such as having a pin 24 in the weight extending through a slot 25 in the support 14.

As the outer race 12 is rotated, or attempted to be rotated, any frictional characteristics or rotating forces which can be transmitted through the balls to the inner race will tend to rotate the inner race, and with it the fitting, wire and weight. Such forces of torsion are easily read on the calibrated scale 23. If a sticky spot is noted, the motor can be immediately stopped, since it and thus the outer race, have a speed of less than 1 r.p.m., and the sticky spot marked.

If desired, the scale and pointer device may be provided with a second pointer 26 which is moved by the pointer 22 to the maximum reading position in a manner well known in the art of meters.

Figure 3:
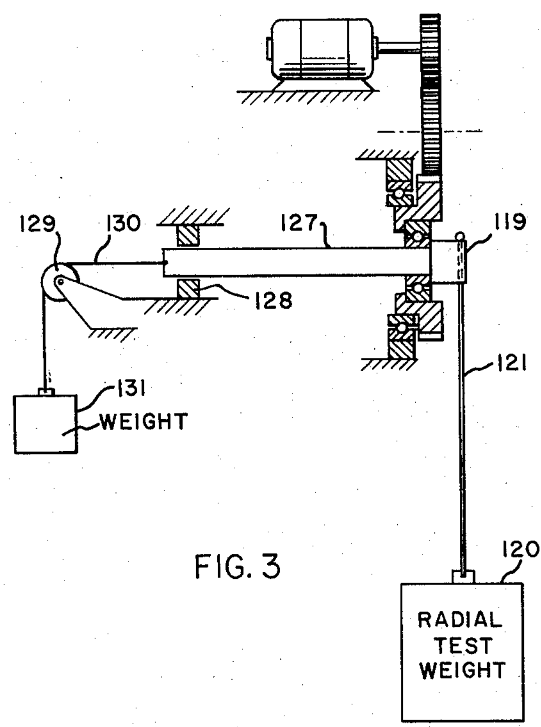
Figure 3 illustrates an alteration or modification of the device.
Figure 4:
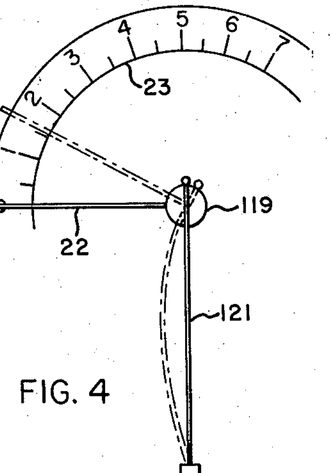
Figure 4 is a view taken along the line 4—4 of Figure 3.

In Figure 3 there is illustrated the positioning of the tester for determining frictional characteristics of the bearing when it is loaded radially. In this instance, the test weight 120 is suspended from fitting 119 by wire 121 which extends radially from the fitting and the axis of rotation of the bearing. The axis of rotation of the bearing is horizontal and, as illustrated in Figure 4, any rotation of the inner race by forces transmitted through the balls flexes the wire 121 and tends to lift the weight 120. These torques or torsional forces, or the movement of the inner race are immediately noted on the torque scale 23.

End play in the bearing is easily eliminated by attaching a guide rod 127 to the fitting and extending it coaxially of the axis of rotation and applying an end thrust to it. The rod 127 is preferably bearinged at its free end, or the end furthest from the bearing being tested, by a bearing 128 on the support to hold the rod coaxial. End thrust is applied in a coaxial direction by means of a pulley 129 over which a wire or cord 130 extends to suspend a weight 131, the wire being attached at the axis of rotation to the end of the rod 127.

In operating the device for either determining end thrust or radial thrust frictional characteristics, the bearing is rotated at a sufficiently slow speed that any friction spots are readily determined, as well as their magnitudes, by watching the scale. The races of the bearings being tested have only their own inertia to carry them over any rough spots, and this inertia is minute inasmuch as the speed of rotation of the gear 15 is less than 1 r.p.m. and the races are individually of relatively no mass or weight. Thus, the objects of the invention are carried out by the described example which has been made for purposes of description and clarity, and not for the purpose of limitation.

It is understood that various modifications may be had in the details and arrangements of the parts, without departing from the spirit and scope of the invention as hereinafter claimed, and that such modifications are considered to be a part hereof when they are within the scope of the objects and claims as herein set forth.

I claim:

1. A device for determining friction characteristics of a ball bearing having an inner and outer race, said device comprising a standard, driving means bearinged in said standard with its axis of rotation horizontally aligned to support and rotate one of said races, a weight, a wire fitted to the other of said races extending substantially radially from said axis and suspending said weight to retard rotation of said other race, and indicating means attached to said other race to indicate rotational movement transmitted thereto from said one of said races.

2. A device for determining friction characteristics of a ball bearing having an inner and outer race, said device comprising a standard, driving means bearinged in said standard with its axis of rotation horizontally aligned to support and rotate one of said races, a weight, a wire extending substanding vertically from said axis fitted to the other of said races and suspending said weight to retard rotation of said other race, means attachable to said other of said races to exert a thrust along the axis of rotation thereof, and indicating means attached to said other race to indicate rotational movement transmitted thereto from said one of said races.

References Cited in the file of this patent

UNITED STATES PATENTS

| | | |
|---|---|---|
| 2,091,022 | Stuart | Aug. 24, 1937 |
| 2,234,228 | Boccasile | Mar. 11, 1941 |
| 2,296,657 | Wallace | Sept. 22, 1942 |
| 2,471,423 | Gisser | May 31, 1949 |
| 2,700,298 | Anderson | Jan. 25, 1955 |

FOREIGN PATENTS

| | | |
|---|---|---|
| 725,299 | Germany | Sept. 18, 1942 |